United States Patent
Qian et al.

(10) Patent No.: US 10,432,538 B2
(45) Date of Patent: Oct. 1, 2019

(54) LINK STATE DETERMINATION METHOD, APPARATUS AND COMPUTER STORAGE MEDIUM

(71) Applicant: Sanechips Technology Co., Ltd., Shenzhen, Guangdong (CN)

(72) Inventors: Qingming Qian, Shenzhen (CN); Hongjuan Xue, Shenzhen (CN); Liuqin Xie, Shenzhen (CN); Bin Lv, Shenzhen (CN)

(73) Assignee: Sanechips Technology Co., Ltd., Shenzhen, Guangdong Province (CN)

( * ) Notice: Subject to any disclaimer, the term of this patent is extended or adjusted under 35 U.S.C. 154(b) by 178 days.

(21) Appl. No.: 15/516,937

(22) PCT Filed: Sep. 21, 2015

(86) PCT No.: PCT/CN2015/090166
§ 371 (c)(1),
(2) Date: Apr. 5, 2017

(87) PCT Pub. No.: WO2016/054968
PCT Pub. Date: Apr. 14, 2016

(65) Prior Publication Data
US 2017/0302582 A1 Oct. 19, 2017

(30) Foreign Application Priority Data
Oct. 8, 2014 (CN) .......................... 2014 1 0529415

(51) Int. Cl.
*H04L 12/819* (2013.01)
*H04L 12/801* (2013.01)
*H04L 1/00* (2006.01)

(52) U.S. Cl.
CPC ............ *H04L 47/21* (2013.01); *H04L 1/0042* (2013.01); *H04L 1/0047* (2013.01); *H04L 47/12* (2013.01)

(58) Field of Classification Search
CPC ......... H04L 47/10; H04L 47/12; H04L 47/21; H04L 47/32; H04L 47/2416;
(Continued)

(56) References Cited

U.S. PATENT DOCUMENTS

| | | | |
|---|---|---|---|
| 7,000,154 B1 | 2/2006 | Leduc | |
| 7,573,832 B2 | 8/2009 | Kenghe | |

(Continued)

FOREIGN PATENT DOCUMENTS

| | | |
|---|---|---|
| CN | 1514609 A | 7/2004 |
| CN | 1738443 A | 2/2006 |

(Continued)

OTHER PUBLICATIONS

International Search Report in international application No. PCT/CN2015/090166, dated Dec. 21, 2015, 2 pgs.
(Continued)

*Primary Examiner* — Peter Chen
(74) *Attorney, Agent, or Firm* — Ling Wu; Stephen Yang; Ling and Yang Intellectual Property (57) ABSTRACT

Disclosed in present invention is a link state control method. The method includes: within a setting time window, determining the reset fixed code word of a received data stream; according to the situation that each cell corresponding to the data stream is received correctly or incorrectly, determining the leaky bucket value of a link in real time; according to the determined reset fixed code word and the determined leaky bucket value, determining the state of the link. Moreover, the present invention also discloses a link state control apparatus and computer storage medium.

14 Claims, 3 Drawing Sheets

(58) Field of Classification Search
CPC ... H04L 1/0041; H04L 1/0042; H04L 1/0009; H04L 1/0002; H04L 1/0047; H04L 43/0852; H04L 43/0829
See application file for complete search history.

(56) References Cited

U.S. PATENT DOCUMENTS

2006/0143492 A1  6/2006 Leduc
2006/0203724 A1* 9/2006 Ghosh .................. H04L 47/10
                                           370/229
2008/0069248 A1* 3/2008 Heise ................... H04L 1/0009
                                           375/254

FOREIGN PATENT DOCUMENTS

| CN | 1905492 A | 1/2007 |
|----|-----------|--------|
| CN | 101741603 A | 6/2010 |
| CN | 102148724 A | 8/2011 |
| CN | 102368720 A | 3/2012 |
| CN | 103052173 A | 4/2013 |
| CN | 103414597 A | 11/2013 |
| WO | 0048423 A | 8/2000 |
| WO | 2008104100 A1 | 9/2008 |

OTHER PUBLICATIONS

English Translation of the Written Opinion of the International Search Authority in international application No. PCT/CN2015/090166, dated Dec. 21, 2015, 5 pgs.

"Scheduling Algorithms in Broad-Band Wireless Networks", Yaxin Cao and Victor O.K. Li, Jan. 2001, IEEE Proceedings of the IEEE, vol. 89, No. 1, 12 pgs.

Supplementary European Search Report in European application No. 15849383.3, dated Jan. 26, 2018, 8 pgs.

* cited by examiner

Fig. 6

LINK STATE DETERMINATION METHOD, APPARATUS AND COMPUTER STORAGE MEDIUM

CROSS-REFERENCE TO RELATED APPLICATION

This application claims priority from Chinese Patent Application No. 201410529415.8, filed Oct. 8, 2014, the entire contents of which are incorporated herein by reference.

TECHNICAL FIELD

The disclosure relates to the field of data communications, and in particular, to a method and apparatus, and computer storage medium for controlling a state of a link.

BACKGROUND

Figure 1:
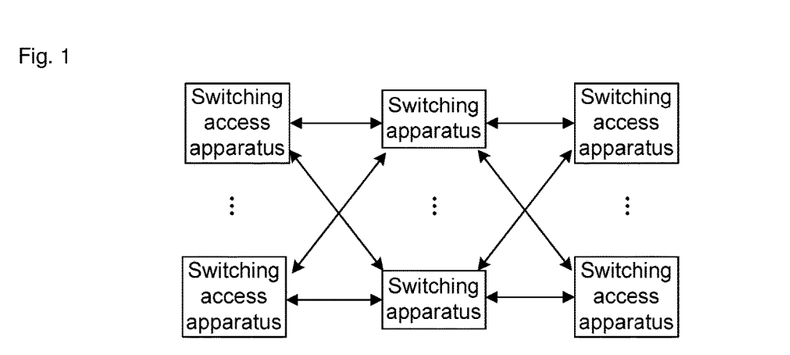
FIG. 1 is a structural diagram of a switching system.

A switching system is a key component of a packet switching device. As shown in FIG. 1, the switching system includes a switching access apparatus and a switching apparatus. The switching access apparatus includes a source switching access apparatus and a destination switching access apparatus. The source switching apparatus divides a network message into cells, and forwards the cells to the destination switching access apparatus via the switching apparatus. The switching apparatus is constituted by the switching units connected to each other. High-speed serial links are used to connect the source switching access apparatus and one of the switching units, to connect every two switching units, and to connect one of the switching units and the destination switching access apparatus.

Data are transmitted in a switching network by using cells as units. The switching access apparatus dynamically establishes a routing table according to a real-time link state, and completes transmission of the cells by looking-up the routing table. Likewise, the switching apparatus will dynamically establish a routing table by monitoring a real-time link state, so as to complete correct forwarding of the cells. It can be thus seen that correct control over a link state according to different switching network environments plays an important role in improvement of the performance of the whole switching network.

However, with the increase of the capacity of the switching network increases, i.e., the increase of the number of switching access apparatuses and switching apparatuses in the switching network as well as the increase of the rates of high-speed serial links connected to each other, there are more and more factors influencing the states of the high-speed serial links. How to effectively control the link state will influence the performance of the whole switching network.

However, according to the link monitoring solution for an existing switching network, frequent link state hopping will happen in a boundary link, thus resulting in instability the routing table of the switching access apparatus or the switching apparatus, and influencing transmission of the cells.

SUMMARY

To solve the existing technical problems, the embodiment of the disclosure provides a method, apparatus and computer storage medium for controlling a state of a link.

The embodiment of the disclosure provides a method for controlling a state of a link, which may includes that: a number of customized resetting codewords of a received data stream is determined within a set time window; a leaky bucket value of the link is determined in real time according to a situation that each of cells corresponding to the data stream is received correctly or incorrectly; and the state of the link is determined according to the determined number of the customized resetting codewords and the determined leaky bucket value.

In the solution, the step that a leaky bucket value of the link is determined in real time according to a situation that each of cells corresponding to the data stream is received correctly or incorrectly may include that: when the number of cells which are received continuously and correctly is equal to the number of cells corresponding to a set decrease rate of the leaky bucket value, the leaky bucket value of the link is decreased by a first value.

In the solution, the step that a leaky bucket value of the link is determined in real time according to a situation that each of cells corresponding to the data stream is received correctly or incorrectly may include that: when the number of cells which are received continuously and incorrectly is equal to the number of cells corresponding to a set increase rate of the leaky bucket value, the leaky bucket value of the link is increased by a second value.

In the solution, the step that a leaky bucket value of the link is determined in real time according to a situation that each of cells corresponding to the data stream is received correctly or incorrectly may include that: when a receiving situation indicator about each of cells is not received within a set period of time, a timer is initiated, and after the timer expires, the leaky bucket value of the link is increased by a third value.

In the solution, the step that the state of the link is determined according to the determined number of the customized resetting codewords and the determined leaky bucket value may include that: when the determined number of the customized resetting codewords reaches a set threshold value for the customized resetting codewords, it is determined that the state of the link is invalid.

In the solution, the step that the state of the link is determined according to the determined number of the customized resetting codewords and the determined leaky bucket value may include that: when the determined number of the customized resetting codewords does not reach the threshold value for the customized resetting codewords and the determined leaky bucket value is smaller than a set first threshold value for the leaky bucket value, it is determined that the state of the link is valid.

In the solution, the step that the state of the link is determined according to the determined number of the customized resetting codewords and the determined leaky bucket value may include that: when the determined number of the customized resetting codewords does not reach the threshold value for the customized resetting codewords and the determined leaky bucket value is greater than the first threshold value for the leaky bucket value and smaller than a set second threshold value for the leaky bucket value, it is determined that the state of the link remains unchanged, the first threshold value for the leaky bucket value being smaller than the second threshold value for the leaky bucket value.

In the solution, the step that the state of the link is determined according to the determined number of the customized resetting codewords and the determined leaky bucket value may include that: when the determined number of the customized resetting codewords does not reach the threshold value for the customized resetting codewords and the determined leaky bucket value is greater than the second threshold value for the leaky bucket value, it is determined that the state of the link is invalid.

In the solution, the method may further include that: when it is determined that the state of the link is invalid, invalidity processing is performed on the link.

The embodiment of the disclosure also provides a method for controlling a state of a link, which may include that: a leaky bucket value of the link is determined in real time according to a situation that each of cells corresponding to a data stream is received correctly or incorrectly; a number of customized resetting codewords of the received data stream is determined within a set time window; and the state of the link is determined according to the determined number of the customized resetting codewords and the determined leaky bucket value.

The embodiment of the disclosure also provides a method for controlling a state of a link, which may include that: a number of customized resetting codewords of a received data stream is determined within a set time window; a leaky bucket value of the link is determined in real time according to a situation that each of cells corresponding to the data stream is received correctly or incorrectly; and the state of the link is determined according to the determined number of the customized resetting codewords and the determined leaky bucket value.

The embodiment of the disclosure also provides an apparatus for controlling a state of a link, which may include: a resetting codeword window detection module, a leaky bucket value determination module and a link state determination module.

The resetting codeword window detection module is arranged to determine a number of customized resetting codewords of a received data stream within a set time window.

The leaky bucket value determination module is arranged to determine a leaky bucket value of the link in real time according to a situation that each of cells corresponding to the data stream is received correctly or incorrectly.

The link state determination module is arranged to determine the state of the link according to the determined number of the customized resetting codewords and the determined leaky bucket value.

In the solution, the apparatus may further include: a link processing module, arranged to conduct, when it is determined that the state of the link is invalid, invalidity processing on the link.

The embodiment of the disclosure also provides a computer storage medium having stored thereon a set of instructions that, when being executed, cause at least one processor execute the abovementioned method for controlling a state of a link.

The embodiment of the disclosure provides the method, apparatus and computer storage medium for controlling a state of a link. A number of customized resetting codewords of a received data stream is determined within a set time window; a leaky bucket value of the link is determined in real time according to a situation that each of cells corresponding to the data stream is received correctly or incorrectly; and the state of the link is determined according to the determined number of the customized resetting codewords and the determined leaky bucket value. Thus, the problem of control over state of a high-speed link in a switching network can be solved and handled, thereby ensuring that a link state will not frequently hop in a boundary link. Moreover, when the link state is poor and an opposite link is reset, the link can be made invalid, so loss of the cells resulting from forwarding of the cells to the invalid link can be effectively prevented, thus improving the performance of the whole switching network system.

BRIEF DESCRIPTION OF THE DRAWINGS

In the accompanying drawings which are not necessarily drawn in scale, similar references may describe similar parts in different views. The similar references having different letter suffixes may represent different examples for the similar parts. The accompanying drawings substantially show various embodiments discussed herein in a way of example instead of a limitation way.

DETAILED DESCRIPTION

The disclosure will be further described in detail herein below in conjunction with drawing embodiments.

Figure 2:
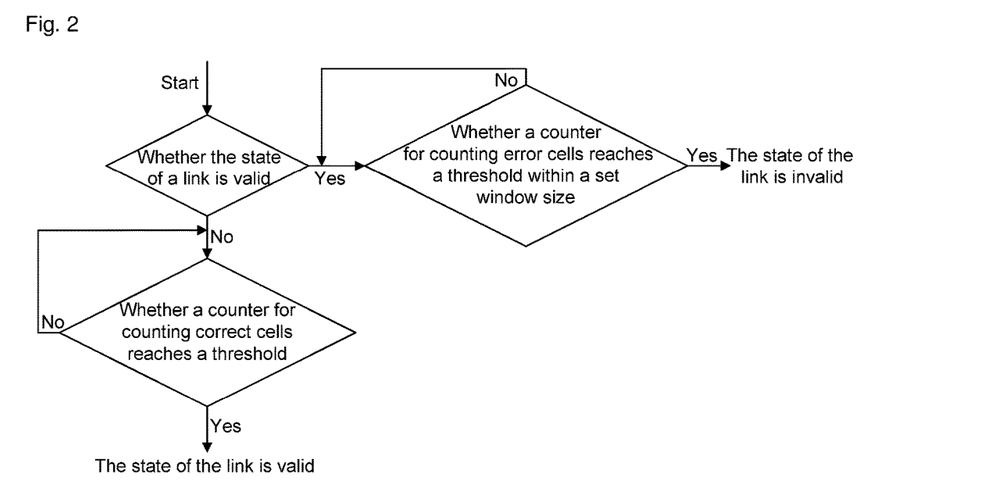
FIG. 2 is a flowchart of a link monitoring method.

FIG. 2 is a processing flow of a link monitoring method of an existing switching network. As shown in FIG. 2, after a data stream completes channel decoding and decoding error correction, synchronous alignment of a data code word, information source decoding, and descrambling, a complete cell body is recovered. Meanwhile, check on the completeness of cells is accomplished. The state monitoring and control of a link are based on the recovered complete cell body. After a correct or incorrect complete cell check is accomplished within a configured window range, a link state indicator is given. When the state of the link is under a frequent change in the code error rate (i.e., the state of the link varies between strength and weakness, in a boundary link), the existing link control method will cause a frequent hop of the link state, thus resulting in instability of a routing table of a switching access apparatus or a switching apparatus, and influencing transmission of cells.

In addition, link state parameters in different scenarios cannot be dynamically adjusted by using the existing link control method.

In view of that, in various embodiments of the disclosure, a number of customized resetting codewords of a received data stream is determined within a set time window; a leaky bucket value of the link is determined in real time according to a situation that each of cells corresponding to the data stream is received correctly or incorrectly; and the state of the link is determined according to the determined number of the customized resetting codewords and determined leaky bucket value.

First Embodiment

Figure 3:
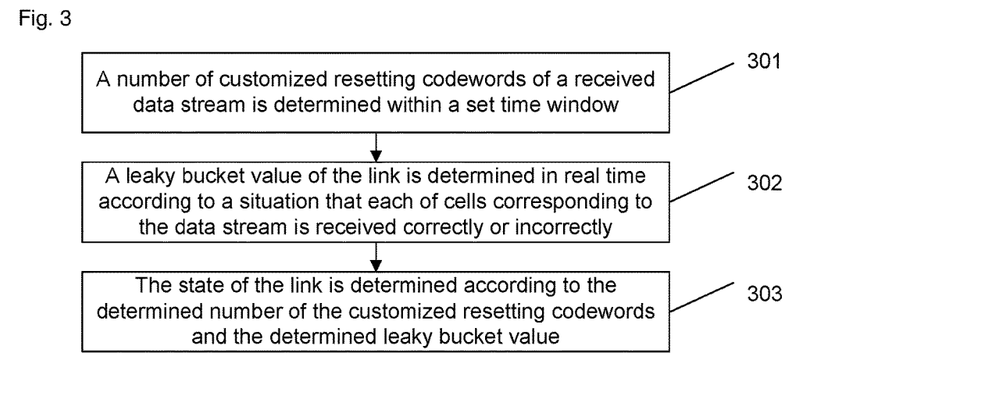
FIG. 3 is a flowchart of a method for controlling a state of a link according to a first embodiment of the disclosure.

As shown in FIG. 3, the present embodiment provides a method for controlling a state of a link. The method includes steps 301-303.

In the step 301, a number of customized resetting codeword of a received data stream is determined within a set time window.

In the step 302, a leaky bucket value of the link is determined in real time according to a situation that each of cells corresponding to the data stream is received correctly or incorrectly.

Specifically, when the number of cells which are received continuously and correctly is equal to the number of cells corresponding to a set decrease rate of the leaky bucket value, the leaky bucket value of the link is decreased by a first value. When the number of cells which are received continuously and incorrectly is equal to the number of cells corresponding to a set increase rate of the leaky bucket value, the leaky bucket value of the link is increased by a second value.

When a receiving situation indicator about each of cells is not received within a set period of time, a timer is initiated. After the timer expires, the leaky bucket value of the link is increased by a third value.

The decrease rate of the leaky bucket value and the increase rate of the leaky bucket value may be set as required. Generally, the increase rate of the leaky bucket value is set to be greater than the decrease rate of the leaky bucket value. In this way, it can be ensured that the link can be made invalid at a higher speed under the condition that the link is poorer, thus preventing loss of the cells resulting from forwarding of the cells to the invalid link.

The first value, the second value and the third value may be determined according to experience. For example, each of the first value, the second value and the third value may be 1 or the like. In practical application, the number of cells corresponding to the increase rate of the leaky bucket value is generally set as 1, that is, the leaky bucket value is added with 1 when an incorrect cell is received.

When the number of cells which are received continuously and correctly is equal to the number of cells corresponding to the set decrease rate of the leaky bucket value, it is shown that the situation of the link is excellent, so the leaky bucket value of the link is decreased by the first value. Correspondingly, when the number of cells which are received continuously and incorrectly is equal to the number of cells corresponding to the set increase rate of the leaky bucket value, it is shown that the situation of the link is bad, so the leaky bucket value of the link is increased by the second value.

The receiving situation indicator about each of cells includes: an indicator of correctly receiving a cell, an indicator of incorrectly receiving a cell, and an indicator of deleting a cell. Here, when a series of check errors results from inconsistency between a received cell and a cell sent by an opposite end, an internal logic of the switching device will mark an error indicator on the cell, that is, a deletion indication signal is received.

The duration of the timer may be set as required.

In practical application, the step 301 may be executed, and then the step 302 may be executed. Alternatively, the step 302 may be executed, and then the step 301 may be executed. Alternatively, the step 301 and step 302 may be executed simultaneously. In other words, the step 301 and step 302 are executed without a particular order.

In the step 303, the state of the link is determined according to the determined number of the customized resetting codewords and the determined leaky bucket value.

Specifically, when the determined number of the customized resetting codewords reaches a set threshold value for the customized resetting codewords, it is determined that the state of the link is invalid.

When the determined number of the customized resetting codewords does not reach the threshold value for the customized resetting codewords and the determined leaky bucket value is smaller than a set first threshold value for the leaky bucket value, it is determined that the state of the link is valid.

When the determined number of the customized resetting codewords does not reach the threshold value for the customized resetting codewords and the determined leaky bucket value is greater than the first threshold value for the leaky bucket value and smaller than a set second threshold value for the leaky bucket value, it is determined that the state of the link remains unchanged.

When the determined number of the customized resetting codewords does not reach the threshold value for the customized resetting codewords and the determined leaky bucket value is greater than the second threshold value for the leaky bucket value, it is determined that the state of the link is invalid.

The threshold value for the customized resetting codewords may be set as required.

The first threshold value for the leaky bucket value is smaller than the second threshold value for the leaky bucket value. In practical application, the first threshold value for the leaky bucket value and the second threshold value for the leaky bucket value may be set as required.

The state of the link is made invalid by using the customized resetting codeword, so a quick response to link state invalidity resulting from opposite-end reset can be achieved, thus improving the forwarding efficiency.

The method may further include that: when it is determined that the state of the link is invalid, invalidity processing is performed on the link.

Here, the invalidity processing may include: sending an indication signal indicating link invalidity to other apparatuses in the switching device, such that a switching access apparatus and a switching apparatus in the switching device will not establish corresponding routing tables, thus preventing incorrect forwarding of the cells.

According to the method for controlling a state of a link provided in the present embodiment, a number of customized resetting codewords of a received data stream is determined within a set time window; a leaky bucket value of the link is determined in real time according to a situation that each of cells corresponding to the data stream is received correctly or incorrectly; and the state of the link is determined according to the determined number of the customized resetting codeword and the determined leaky bucket value. Thus, the problem of state control over a high-speed link in a switching network can be solved and handled, thereby ensuring that a link state will not frequently hop in a boundary link. Moreover, when the link state is poor and an opposite link is reset, the link can be made invalid quickly, so loss of the cells resulting from forwarding of the cells to the invalid link can be effectively prevented, thus improving the performance of the whole switching network system.

In addition, in practical application, these link state parameters such as the increase rate of the leaky bucket value, the decrease rate of the leaky bucket value, the first threshold value for the leaky bucket value and the second threshold value for the leaky bucket value may be dynamically configured according to different application scenarios, thus being adaptive to control over a link state in different application scenarios.

Second Embodiment

Figure 4:
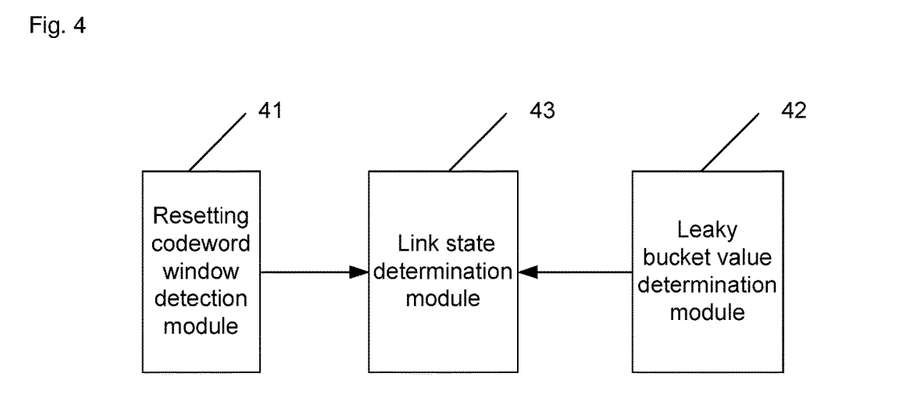
FIG. 4 is a structural diagram of an apparatus for controlling a state of a link according to a second embodiment of the disclosure.

To implement the method in embodiment 1, the present embodiment provides an apparatus for controlling a state of a link. As shown in FIG. 4, the apparatus includes: a resetting codeword window detection module 41, a leaky bucket value determination module 42 and a link state determination module 43.

The resetting codeword window detection module 41 is arranged to determine a number of customized resetting codewords of a received data stream within a set time window.

The leaky bucket value determination module 42 is arranged to determine a leaky bucket value of the link in real time according to a situation that each of cells corresponding to the data stream is received correctly or incorrectly.

The link state determination module 43 is arranged to determine the state of the link according to the determined number of the customized resetting codewords and the determined leaky bucket value.

The leaky bucket value determination module 42 is specifically arranged to: decrease, when the number of cells which are received continuously and correctly is equal to the number of cells corresponding to a set decrease rate of the leaky bucket value, the leaky bucket value of the link by a first value; increase, when the number of cells which are received continuously and incorrectly is equal to the number of cells corresponding to a set increase rate of the leaky bucket value, the leaky bucket value of the link by a second value; and initiate a timer when a receiving situation indicator about each of cells is not received within a set period of time; and after the timer expires, increase the leaky bucket value of the link by a third value.

Here, the decrease rate of the leaky bucket value and the increase rate of the leaky bucket value may be set as required, and generally, the increase rate of the leaky bucket value is set to be greater than the decrease rate of the leaky bucket value. So, it can be ensured that the link can be made invalid at a higher speed under the condition that the link is poor, thus preventing loss of the cells resulting from forwarding of the cells to the invalid link.

The first value, the second value and the third value may be determined according to experience. For example, each of the first value, the second value and the third value is 1 or the like. In practical application, the number of cells corresponding to the increase rate of the leaky bucket value is generally set as 1, that is, the leaky bucket value is added with 1 when an incorrect cell is received.

When the number of cells which are received continuously and correctly is equal to the number of cells corresponding to the set decrease rate of the leaky bucket value, it is shown that the situation of the link is excellent. In such case, the leaky bucket value determination module 42 decreases the leaky bucket value of the link by the first value. Correspondingly, when the number of cells which are received continuously and incorrectly is equal to the number of cells corresponding to the set increase rate of the leaky bucket value, it is shown that the situation of the link is bad. In such case, the leaky bucket value determination module 42 increases the leaky bucket value of the link by the second value.

The receiving situation indicator about each of cells includes: an indicator of correctly receiving a cell, an indicator of incorrectly receiving a cell, and an indicator of deleting a cell. Here, when a series of check errors results from inconsistency between a received cell and a cell sent by an opposite end, an internal logic of the switching device will mark an error indicator on the cell, that is, a deletion indication signal is received.

The duration of the timer may be set as required.

The link state determination module 43 is specifically arranged to: when the determined number of the customized resetting codewords reaches a set threshold value for the customized resetting codewords, determine that the state of the link is invalid; when the determined number of the customized resetting codewords does not reach the threshold value for the customized resetting codewords and the determined leaky bucket value is smaller than a set first threshold value for the leaky bucket value, determine that the state of the link is valid; when the determined number of the customized resetting codewords does not reach the threshold value for the customized resetting codewords and the determined leaky bucket value is greater than the first threshold value for the leaky bucket value and smaller than a set second threshold value for the leaky bucket value, determine that the state of the link remains unchanged; and when the determined number of the customized resetting codewords does not reach the threshold value for the customized resetting codewords and the determined leaky bucket value is greater than the second threshold value for the leaky bucket value, determine that the state of the link is invalid.

The threshold value for the customized resetting codewords may be set as required.

The first threshold value for the leaky bucket value is smaller than the second threshold value for the leaky bucket value. In practical application, the first threshold value for the leaky bucket value and the second threshold value for the leaky bucket value may be defined as required.

The state of the link is made invalid by using the customized resetting codeword, so a quick response to link state invalidity resulting from opposite-end reset can be achieved, thus improving the forwarding efficiency.

The apparatus may further include a link processing module, arranged to conduct invalidity processing on the link when it is determined that the state of the link is invalid.

Here, the invalidity processing may include: sending a link invalidity indication signal to other apparatuses in the switching device, such that a switching access apparatus and a switching apparatus in the switching device will not establish corresponding routing tables, thus preventing incorrect forwarding of the cells.

In practical application, the apparatus for controlling a state of a link provided in the present embodiment is located in the switching device. The resetting codeword window detection module 41, the leaky bucket value determination module 42, the link state determination module 43 and link processing module may be implemented by a Central Processing Unit (CPU), a Digital Signal Processor (DSP) or a Field-Programmable Gate Array (FPGA) in the apparatus for controlling a state of a link in conjunction with a specific circuit.

According to the apparatus for controlling a state of a link provided in the present embodiment, the resetting codeword window detection module 41 is arranged to determine a number of customized resetting codewords of a received data stream within a set time window; the leaky bucket value determination module 42 is arranged to determine a leaky bucket value of the link in real time according to a situation that each of cells corresponding to the data stream is received correctly or incorrectly; and the link state determination module 43 is arranged to determine the state of the link according to the determined number of the customized resetting codewords and the determined leaky bucket value. Thus, the problem of control over state a high-speed link in a switching network can be solved and handled, thereby ensuring that a link state will not frequently hop in a boundary link. Moreover, when the link state is poor and an opposite link is reset, the link can be made invalid. As such, loss of the cells resulting from forwarding of the cells to the invalid link can be effectively prevented, thus improving the performance of the whole switching network system.

In addition, in practical application, these link state parameters such as the increase rate of the leaky bucket value, the decrease rate of the leaky bucket value, the first threshold value for the leaky bucket value and the second threshold value for the leaky bucket value may be dynamically configured depending on different application scenarios, thereby being adaptive to control over a link state in different application scenarios.

Third Embodiment

Figure 5:
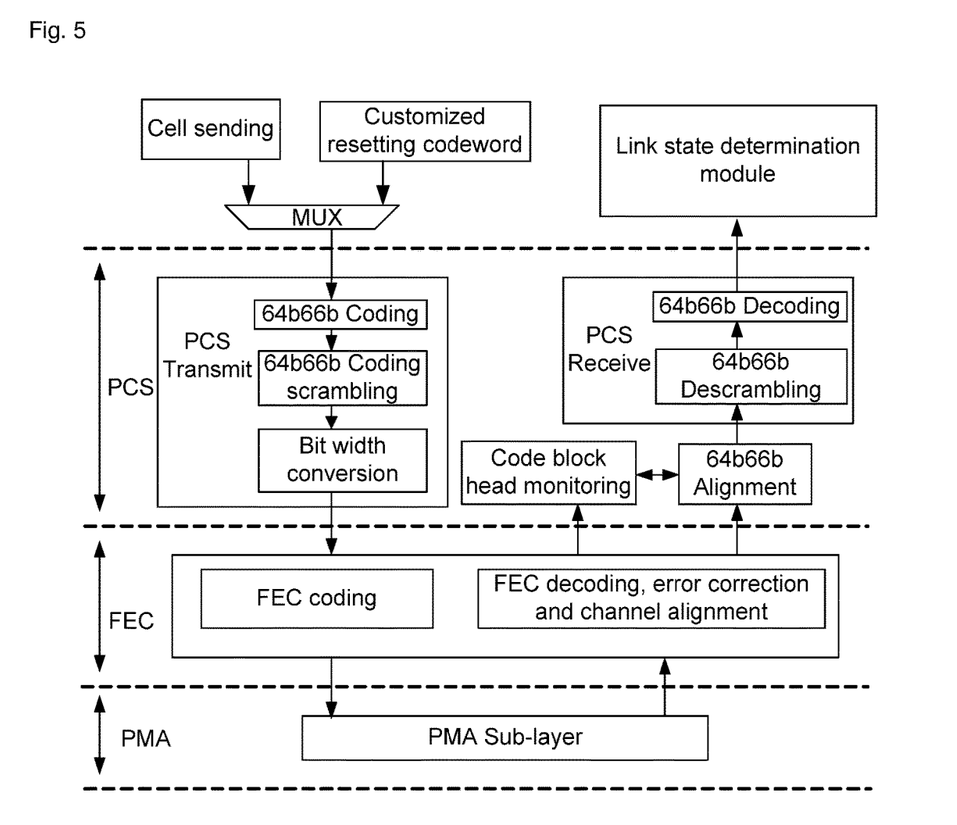
FIG. 5 is a diagram of flow of signals in controlling a state of a link according to a third embodiment of the disclosure.
Figure 6:
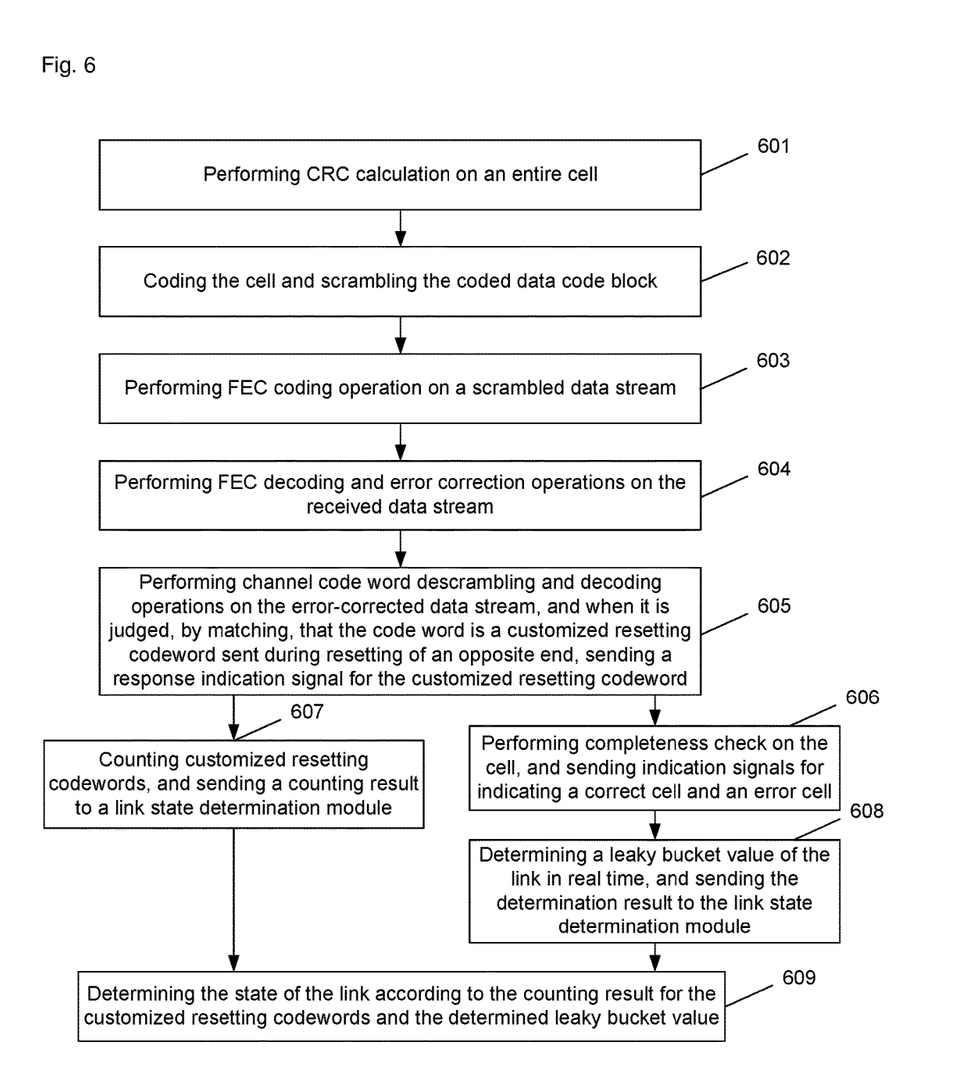
FIG. 6 is a flowchart of a method for controlling a state of a link according to the third embodiment of the disclosure.

The present embodiment is illustrated with a complete data stream of a high-speed link interface in a switching network. FIG. 5 is a diagram of flow of signals in controlling a state of a link according to the embodiment of the disclosure. As shown in FIG. 6, in conjunction with FIG. 5, the method for controlling a state of a link in the present embodiment includes steps 601-609.

In the step 601, Cyclic Redundancy Check (CRC) calculation is performed on an entire cell.

Here, CRC calculation is performed on the entire cell in cell sending.

In the step 602, the CRC-calculated cell is coded, and the coded data code block is scrambled.

Here, scrambling the coded data is intended to achieve direct current balance for an entire code stream.

In the step 603, a Forward Error Correction (FEC) coding operation is executed on the scrambled data stream.

Here, in view of a burst error of a switching network cluster environment, the FEC coding operation will be performed on the scrambled data stream.

The steps 601-603 are operations performed by a cell sending end.

In the step 604, FEC decoding and error correction operations are performed on the received data stream.

Here, a data stream processing apparatus in the switching device performs the FEC decoding and error correction operations on the received data stream.

The present step is performed to correct a burst error depending on different error correction capability ranges corresponding to different adopted code forms, so as to reduce the code error rate.

In the step 605, channel code word descrambling and decoding operations are performed on the error-corrected data stream, so as to recover a code block same as that in the sending end. Meanwhile, matching is performed to judge whether the code word is a customized resetting codeword sent during resetting of an opposite end. If the code word is the customized resetting codeword sent during resetting of the opposite end, a response indication signal for the customized resetting codeword is sent to the apparatus for controlling a state of a link.

Specifically, the data stream processing apparatus performs channel code word descrambling and decoding operations on the error-corrected data stream, so as to recover a code block same as that in the sending end. Meanwhile, matching is performed to judge whether the code word is a customized resetting codeword sent during resetting of an opposite end. If the code word is the customized resetting codeword sent during resetting of the opposite end, a response indication signal for the customized resetting codeword is sent to the apparatus for controlling a state of a link in the switching device.

In the step 606, a cell is recovered, completeness check is performed on the cell, and indication signals for a correct cell and an error cell are sent to the apparatus for controlling a state of a link.

Specifically, the data stream processing apparatus recovers a cell, performs completeness check on the cell, and sends indication signals for a correct cell and an error cell to the apparatus for controlling a state of a link.

Here, the completeness check includes check on length and payload correctness.

In the step 607, a resetting codeword window detection module of the apparatus for controlling a state of a link counts, according to received response indication signals for customized resetting codewords, customized resetting codewords corresponding to the response indication signals within a dynamically configurable time window, and sends a counting result to a link state determination module of the apparatus for controlling a state of a link.

Here, in practical application, the steps 606 and 607 are performed without a particular order.

In the step 608, a leaky bucket value determination module of the apparatus for controlling a state of a link determines, in real time, a leaky bucket value of the link according to the received indication signals for the correct cell and the error cell, and sends a determination result to the link state determination module.

Specifically, the leaky bucket value determination module decreases, when the number of cells which are received continuously and correctly is equal to the number of cells corresponding to a set decrease rate of the leaky bucket value, the leaky bucket value of the link by 1. The leaky bucket value determination module increases, when the number of cells which are received continuously and incorrectly is equal to the number of cells corresponding to a set increase rate of the leaky bucket value, the leaky bucket value of the link by 1. The leaky bucket value determination module initiates an overflow reverse counter (i.e., timer) in the absence of a receiving cell indicator (indication signals for the correct cell and the error cell) and a deletion cell indicator. After the counter reaches saturation (i.e., the time expires), the leaky bucket value is increased by 1, so as to count the leaky bucket value of the link in real time.

In practical application, the steps 608 and 607 are performed without a particular order.

In the step 609, the link state determination module determines the state of the link according to the determined customized resetting codewords and the determined leaky bucket value.

Specifically, when the counting result of the customized resetting codewords reach a set threshold value for the customized resetting codewords, the link state determination module determines that the state of the link is invalid, and provides a link invalidity indication signal for other apparatuses in the switching device, so as to avoid incorrectly forwarding a cell.

When the counting result of the customized resetting codewords do not reach the threshold value for the customized resetting codewords and the determined leaky bucket value is smaller than a set first threshold value for the leaky bucket value, the link state determination module determines that the state of the link is valid.

When the counting result of the customized resetting codewords do not reach the threshold value for the customized resetting codewords and the determined leaky bucket value is greater than the first threshold value for the leaky bucket value and smaller than a set second threshold value for the leaky bucket value, the link state determination module determines that the state of the link remains unchanged.

When the counting result of the customized resetting codewords do not reach the threshold value for the customized resetting codewords and the determined leaky bucket value is greater than the second threshold value for the leaky bucket value, the link state determination module determines that the state of the link is invalid, and provides a link invalidity indication signal for other apparatuses in the switching device, so as to avoid incorrectly forwarding a cell.

Here, after the link is invalid and before the state of the link is valid again, the received cell cannot be transmitted into a chip of a forwarding device, and a routing table will not be established. In this way, the cell can be prevented from being forwarded incorrectly.

It is to be noted that the steps 604-609 are operations performed by a cell receiving end (i.e., the switching device).

From the foregoing description, it can be seen that the present embodiment well solves, by means of a link leaky bucket mechanism, the problems that the state of a link is easy to hop under an edge state and how to quickly make the state of the link invalid, can effectively prevent cells from being forwarded incorrectly, and improves the performance of a switching network system.

Those skilled in the art should understand that the embodiment of the disclosure may be provided as a method, a system or a computer program product. Thus, the disclosure may adopt a form of a hardware embodiment, a software embodiment or an embodiment integrating software and hardware. Moreover, the disclosure may adopt a form of a computer program product implemented on computer available storage media or medium (including, but not limited to, a disk memory, an optical memory, etc.) containing computer available program codes.

The disclosure is described with reference to flowcharts and/or block diagrams of the method, the device (system) and the computer program product according to the embodiments of the disclosure. It is to be understood that each flow and/or block in the flowcharts and/or the block diagrams and combination of the flows and/or the blocks in the flowcharts and/or the block diagrams may be implemented by computer program instructions. These computer program instructions may be provided for a general computer, a dedicated computer, an embedded processor or processors of other programmable data processing devices to generate a machine, such that an apparatus for implementing functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, such that a manufactured product including an instruction apparatus is generated via the instructions stored in the computer readable memory, and the instruction apparatus implements the functions designated in one or more flows of the flowcharts and/or one or more blocks of the block diagrams.

These computer program instructions may also be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flowcharts and/or one or more blocks of the block diagrams.

On the basis of this, the embodiment of the disclosure also provides a computer storage medium. The computer storage medium includes a set of instructions that, when being executed, cause at least one processor to execute the above-mentioned method for controlling a state of a link.

The above is only the preferred embodiments of the disclosure and not intended to limit the scope of protection of the disclosure.

What is claimed is:

1. A method for determining a state of a link performed by a switching device in a switching network, comprising:
   determining a number of customized resetting codewords of a received data stream within a set time window;
   determining a leaky bucket value of the link in real time according to a situation that each of cells corresponding to the received data stream is received correctly or incorrectly; and
   determining the state of the link according to the determined number of the customized resetting codewords and the determined leaky bucket value;
   wherein the step of determining the leaky bucket value of the link in real time according to the situation that each of cells corresponding to the received data stream is received correctly or incorrectly comprises:
      when a number of cells which are received continuously and correctly is equal to a number of cells corresponding to a set decrease rate of the leaky bucket value, decreasing the leaky bucket value of the link by a first value;
      when a number of cells which are received continuously and incorrectly is equal to a number of cells corresponding to a set increase rate of the leaky bucket value, increasing the leaky bucket value of the link by a second value; and
      when a receiving situation indicator about each of the cells is not received within a set period of time, initiating a timer, and after the timer expires, increasing the leaky bucket value of the link by a third value.

2. The method according to claim 1, wherein determining the state of the link according to the determined number of the customized resetting codewords and the determined leaky bucket value comprises:
   when the determined number of the customized resetting codewords reaches a set threshold value for the customized resetting codewords, determining that the state of the link is invalid.

3. The method according to claim 1, wherein the step of determining the state of the link according to the determined number of the customized resetting codewords and the determined leaky bucket value comprises:
   when the determined number of the customized resetting codewords does not reach a threshold value for the customized resetting codewords and the determined leaky bucket value is smaller than a set first threshold value for the leaky bucket value, determining that the state of the link is valid.

4. The method according to claim 1, wherein the step of determining the state of the link according to the determined number of the customized resetting codewords and the determined leaky bucket value comprises:

when the determined number of the customized resetting codewords does not reach a threshold value for the customized resetting codewords and the determined leaky bucket value is greater than a first threshold value for the leaky bucket value and smaller than a second threshold value for the leaky bucket value, determining that the state of the link remains unchanged, the first threshold value for the leaky bucket value being smaller than the second threshold value for the leaky bucket value.

5. The method according to claim 1, wherein the step of determining the state of the link according to the determined number of the customized resetting codewords and the determined leaky bucket value comprises:

when the determined number of the customized resetting codewords does not reach a threshold value for the customized resetting codewords and the determined leaky bucket value is greater than a second threshold value for the leaky bucket value, determining that the state of the link is invalid.

6. The method according to claim 1, further comprising: when it is determined that the state of the link is invalid, performing invalidity processing on the link.

7. A non-transitory computer-readable storage medium, comprising a set of instructions that, when being executed, cause at least one processor to execute the method for determining a state of a link according to claim 1.

8. A method for determining a state of a link performed by a switching device in a switching network, comprising:

determining a leaky bucket value of the link in real time according to a situation that each of cells corresponding to a received data stream is received correctly or incorrectly;

determining a number of customized resetting codewords of the received data stream within a set time window; and determining the state of the link according to the determined number of the customized resetting codewords and the determined leaky bucket value;

wherein the step of determining the leaky bucket value of the link in real time according to the situation that each of cells corresponding to the received data stream is received correctly or incorrectly comprises:

when a number of cells which are received continuously and correctly is equal to a number of cells corresponding to a set decrease rate of the leaky bucket value, decreasing the leaky bucket value of the link by a first value;

when a number of cells which are received continuously and incorrectly is equal to a number of cells corresponding to a set increase rate of the leaky bucket value, increasing the leaky bucket value of the link by a second value; and when a receiving situation indicator about each of the cells is not received within a set period of time, initiating a timer, and after the timer expires, increasing the leaky bucket value of the link by a third value.

9. An apparatus for determining a state of a link in a switching network, the apparatus comprising: one or more processors executing computer readable instructions for a resetting codeword window detection module, a leaky bucket value determination module and a link state determination module, wherein the resetting codeword window detection module is arranged to determine a number of customized resetting codewords of a received data stream within a set time window;

the leaky bucket value determination module is arranged to determine a leaky bucket value of the link in real time according to a situation that each of cells corresponding to the received data stream is received correctly or incorrectly; and the link state determination module is arranged to determine the state of the link according to the determined number of the customized resetting codewords and the determined leaky bucket value;

wherein when determining the leaky bucket value of the link in real time according to the situation that each of cells corresponding to the received data stream is received correctly or incorrectly, the leaky bucket value determination module is further arranged to:

when a number of cells which are received continuously and correctly is equal to a number of cells corresponding to a set decrease rate of the leaky bucket value, decrease the leaky bucket value of the link by a first value;

when a number of cells which are received continuously and incorrectly is equal to a number of cells corresponding to a set increase rate of the leaky bucket value, increase the leaky bucket value of the link by a second value; and when a receiving situation indicator about each of the cells is not received within a set period of time, initiate a timer, and after the timer expires, increase the leaky bucket value of the link by a third value.

10. The apparatus according to claim 9, wherein the one or more processors further execute computer readable instructions for a link processing module, which is arranged to, when it is determined that the state of the link is invalid, perform invalidity processing on the link.

11. The apparatus according to claim 9, wherein the link state determination module is arranged to:

when the determined number of the customized resetting codewords reaches a set threshold value for the customized resetting codewords, determine that the state of the link is invalid.

12. The apparatus according to claim 9, wherein the link state determination module is arranged to:

when the determined number of the customized resetting codewords does not reach a threshold value for the customized resetting codewords and the determined leaky bucket value is smaller than a set first threshold value for the leaky bucket value, determine that the state of the link is valid.

13. The apparatus according to claim 9, wherein the link state determination module is arranged to:

when the determined number of the customized resetting codewords does not reach a threshold value for the customized resetting codewords and the determined leaky bucket value is greater than a first threshold value for the leaky bucket value and smaller than a second threshold value for the leaky bucket value, determine that the state of the link remains unchanged, the first threshold value for the leaky bucket value being smaller than the second threshold value for the leaky bucket value.

14. The apparatus according to claim 9, wherein the link state determination module is arranged to:
when the determined number of the customized resetting codewords does not reach a threshold value for the customized resetting codewords and the determined leaky bucket value is greater than a second threshold value for the leaky bucket value, determine that the state of the link is invalid.

\* \* \* \* \*